US008478246B2

(12) United States Patent
Wang et al.

(10) Patent No.: US 8,478,246 B2
(45) Date of Patent: Jul. 2, 2013

(54) METHOD AND SYSTEM FOR PROVIDING REAL TIME RINGBACK TONE, AND TERMINAL THEREOF

(75) Inventors: Zhengwei Wang, Shenzhen (CN); Jian Liu, Shenzhen (CN); Qian Sun, Shenzhen (CN); Weijie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1390 days.

(21) Appl. No.: 12/003,921

(22) Filed: Jan. 3, 2008

(65) Prior Publication Data

US 2008/0108334 A1    May 8, 2008

Related U.S. Application Data

(63) Continuation of application No. PCT/CN2006/003399, filed on Dec. 13, 2006.

(30) Foreign Application Priority Data

Dec. 17, 2005  (CN) .......................... 2005 1 0120920
Dec. 25, 2005  (CN) .......................... 2005 1 0121301

(51) Int. Cl.
   *H04M 3/42*    (2006.01)
(52) U.S. Cl.
   USPC .................. 455/414.1; 455/567; 379/207.16
(58) Field of Classification Search
   USPC .................... 455/567, 414.1; 379/207.16
   See application file for complete search history.

(56) References Cited

U.S. PATENT DOCUMENTS

| 5,604,791 | A | * | 2/1997 | Lee ........................... 379/88.21 |
| 2002/0147811 | A1 | | 10/2002 | Schwartz et al. |
| 2002/0181672 | A1 | | 12/2002 | Cannell et al. |
| 2004/0102163 | A1 | * | 5/2004 | Seki ................................ 455/91 |
| 2004/0218743 | A1 | | 11/2004 | Hussain et al. |
| 2006/0109968 | A1 | * | 5/2006 | Hahm et al. ............. 379/207.16 |

FOREIGN PATENT DOCUMENTS

| CN | 1488229 A | 4/2004 |
| CN | 1498508 | 5/2004 |
| CN | 1553720 | 12/2004 |
| CN | 1852362 A | 10/2006 |
| CN | 1852363 A | 10/2006 |

(Continued)

OTHER PUBLICATIONS

English language Written Opinion of PCT/CN2006/003399, mailed Mar. 29, 2007 (5 pages).

(Continued)

*Primary Examiner* — Justin Lee (57) ABSTRACT

The invention discloses a method for providing a real time ringback tone in a communication network and the method includes: establishing a call connection between a calling party and a called party according to a received calling request; receiving a ringback tone indication value from the called party; obtaining a corresponding ringback tone according to the ringback tone indication value; and playing the corresponding ringback tone to the calling party. The invention further provides a system for providing a real time ringback tone in a communication network and a terminal therefor. By using the technology of the invention, a different ringback tone can be played to the calling user in real time according to the current situation. Therefore, individualized requirements of the user may be met and the quality of communication service may be further improved.

19 Claims, 7 Drawing Sheets

FOREIGN PATENT DOCUMENTS

| | | |
|---|---|---|
| CN | 100493120 C | 5/2009 |
| CN | 1859478 B | 2/2011 |
| EP | 1 408 711 A1 | 4/2004 |
| WO | WO-03/009632 A1 | 1/2003 |
| WO | WO 2004/016021 A1 | 2/2004 |
| WO | WO 2004/032460 A2 | 4/2004 |
| WO | WO-2004/054282 A2 | 6/2004 |
| WO | WO 2005/112492 | 11/2005 |

OTHER PUBLICATIONS

Russian Office Action 2008125796/09(031371), dated Mar. 17, 2010 (4 pages).

International Search Report from the Chinese Patent Office for International Application No. PCT/CN2006/003399.

Russian Office Action 2008125796/09(031371), dated Sep. 2, 2010, and English language translation thereof.

First Chinese Office Action issued in Chinese Patent application No. 200680011928.3, on Nov. 6, 2009, and partial English language translation thereof.

First Chinese Office Action issued in Chinese Patent application No. 200510120920.8, on Nov. 7, 2008, and partial English language translation thereof.

Second Chinese Office Action issued in Chinese Patent application No. 200510120920.8, on Aug. 21, 2009, and partial English language translation thereof.

Coloring Ring Back Tone Service System, Enhancing Your Personality; Beijing Linkhead Technologies Co., Ltd. (Dec. 31, 2003).

Extended European Search Report for European Application No. 06828317.5 including supplementary European search report and European search opinion (Jan. 8, 2009).

Examination Report dated Aug. 9, 2012 in connection with India Patent Application No. 1365/MUMNP/2008.

Second Chinese Office Action issued in Chinese Application No. 200880011928.3 on Apr. 14, 2011 (10 pgs.).

First Chinese Office Action issued in Chinese Application No. 200510121301.0 on Oct. 10, 2008 (6 pgs.).

Third Chinese Office Action issued in Chinese Application No. 200880011928.3 on Sep. 21. 2011 (6 pgs.).

* cited by examiner

METHOD AND SYSTEM FOR PROVIDING REAL TIME RINGBACK TONE, AND TERMINAL THEREOF

CROSS REFERENCE TO RELATED APPLICATIONS

This application is a continuation of International Application No. PCT/CN2006/003399, filed Dec. 13, 2006, which claims the priorities of CN Application No. 200510120920.8 filed on Dec. 17, 2005, titled "METHOD AND SYSTEM FOR PROVIDING REAL TIME RINGBACK TONE", and CN Application No. 200510121301.0 filed on Dec. 25, 2005, titled "METHOD AND SYSTEM FOR PROVIDING REAL TIME RINGBACK TONE", the contents of all of which are incorporated herein by reference in their entirety.

FIELD OF THE INVENTION

The present invention relates to the technology for providing a ringing tone in a communication network, in particular, to a method and system for providing a ringback tone in a communication network, and a terminal therefor.

BACKGROUND OF THE INVENTION

In the existing communication network, no matter it is fixed communication network, Global System for Mobile communication (GSM) network or Code Division Multiple Access (CDMA) mobile communication network, when a called party receives an incoming call from a calling party, the called party may select to or not to answer the call, or even to reject the call (the called party may reject an incoming call by pressing the call-termination key). We may often encounter such a case that the called party is busy when an incoming call arrives; for example, the called party is busy answering another important call, or dealing with an important affair, or is in a meeting. In this case, the called party usually rejects the call, and the Terminating Mobile Switching Center (T_MSC) in the prior art plays an invariable prompt tone, such as "The subscriber you dialed cannot be connected for the moment" or "The subscriber you dialed is busy now", to the calling party.

If it is the first time that the calling party encounters such a case, he/she may take it for granted as indicated by the prompt tone that the called party cannot be connected or the called party is busy. However, as time passes, all people know that the occurrence of such a prompt tone results from the called party's rejection of the call. Moreover, before the called party rejects the call, the calling party may hear a ringback tone which indicates that the called party is in idle state. In practice, it is considered as impolite to reject a call and this may affect the relationship between the calling and called parties. Even if the called party calls back to the calling party for explanation after the event, the effect may be imperfect due to untimeliness.

Additionally, in the prior art, there also exists a technical solution for a user to customize a ringback tone. In other words, after a called party subscribes to a ringback tone service, when a calling terminal calls the called terminal and the called party is in idle state, a Ringback Tone Server (RBTS) sends a ringback tone customized by the called party to the calling party. Here, the called party may customize different ringback tones according to individual tastes, or according to calling numbers or according to time. Thus, the individualized requirements of the user may be met to a certain degree. However, these ringback tones are precustomized, so different ringback tones cannot be sent in real time according to the actual situation to meet the requirements of the terminal user flexibly.

SUMMARY OF THE INVENTION

Therefore, an embodiment of the invention provides a method for providing a real time ringback tone in a communication network and by the method a called party may send different ringback tones according to the current situation.

A method for providing ringback tone in a communication network, includes:

establishing a call connection between a calling party and a called party according to a received calling request;

receiving a ringback tone indication value from the called party;

obtaining a corresponding ringback tone according to the ringback tone indication value; and playing the corresponding ringback tone to the calling party.

An embodiment of the invention further provides a system for providing ringback tone in a communication network, including a ringback tone unit that is configured to: store ringback tones; receive a ringback tone indication value sent from a terminal; obtain a corresponding ringback tone according to the ringback tone indication value; play the corresponding ringback tone to a calling party.

An embodiment of the invention further provides a terminal, including:

an information transceiving unit, capable of delivering received information to a master control unit and sending information to the outside under the control of the master control unit;

the master control unit, capable of performing a call connection operation when determining that a calling request is received, and sending a notification to a ringback tone indicating unit; and the ringback tone indicating unit, capable of sending a ringback tone indication value via the information transceiving unit according to the notification.

By employing the technical solutions described in the embodiments of the invention, when a called terminal receives a calling request from a calling terminal, the called terminal may send a ringback tone indication value, and a ringback tone unit sends a ringback tone to the called terminal in real time according to the ringback tone indication value. Thus, the called terminal may send different ringback tones to the calling terminal in real time according to the current situation. Therefore, the individualized requirements of the user may be met, and the quality of communication service may be further improved. For example, via the real time ringback tone, the called party may send the reason for rejecting a call to the calling party in time and reasonably, so that misunderstanding between the calling and called parties may be avoided. Moreover, via the real time ringback tone, the called party may express the current mood, state, etc. to the calling party.

DETAILED DESCRIPTION OF THE EMBODIMENTS

In order to make the technical solutions and advantages of the present invention more apparent, the invention will now be further described in detail in conjunction with the drawings and embodiments.

In the embodiments of the invention, when a called terminal receives an incoming calling request from a calling terminal, the called terminal may send a ringback tone indication value to a ringback tone unit on the network and the ringback tone unit sends a corresponding ringback tone to the calling terminal in real time according to the ringback tone indication value.

For real time ringback tone service, the called party may be registered in the real time ringback tone service by subscribing in a business hall or by calling a special number, or via Internet.

The above ringback tone indication value may be a ringback tone ID or a cause value. The invention will now be described in connection with these two cases respectively.

Embodiment 1: The ringback tone indication value is a ringback tone ID.

In order to realize real time ringback tone service, a corresponding ringback tone needs to be saved in the ringback tone unit according to the ringback tone ID, as shown in Table 1:

TABLE 1

| Ringback Tone ID | Ringback Tone |
| --- | --- |
| 1 | real time ringback tone 1 |
| 2 | real time ringback tone 2 |
| 3 | real time ringback tone 3 |
| 4 | real time ringback tone 4 |
| 5 | real time ringback tone 5 |

If the called terminal does not send a ringback tone ID or a ringback tone ID sent is invalid, in other words, if the ringback tone ID is null, the corresponding ringback tone will be a default ringback tone or a traditional ringback tone. In this case, the ringback tone unit will send the default ringback tone or the traditional ringback tone to the calling terminal.

The default ringback tone may be set for all the calling terminals. In this case, all the calling terminals correspond to the same ringback tone. The default ringback tone may be set for individual calling terminals. In this case, a calling terminal-default ringback tone correspondence table may be established according to the calling ID, as shown in Table 2. In the table, the calling terminal ID is a Mobile Station Integrated Service Digital Number (MSISDN) of the calling party. Thus, the RBTS determines the default ringback tone according to the calling terminal ID.

TABLE 2

| Calling Terminal ID | Default Ringback Tone ID |
| --- | --- |
| 13923812345 | 1 |
| 13323622336 | 2 |
| 82882233 | 3 |

The default ringback tone may be set for all the called terminals. In this case, all the called terminals correspond to the same ringback tone. The default ringback tone may also be set for individual called terminals. In this case, a called terminal-default ringback tone correspondence table may be established according to the called ID, as shown in Table 3. In Table 3, the called terminal ID is the MSISDN of the called party. Thus, the RBTS determines the default real time ringback tone according to called terminal ID.

TABLE 3

| Called Terminal ID | Default Ringback Tone ID |
| --- | --- |
| 13923812345 | 1 |
| 13323622336 | 2 |
| 82882233 | 3 |

If the called terminal sends a ringback tone ID, the corresponding real time ringback tone will be played according to the ringback tone ID, such as real time ringback tone 1-5 as shown in Table 1. These real time ringback tones may have the corresponding voice prompt content about the reason for rejection. For example, real time ringback tone 1 has the corresponding voice prompt content "The subscriber you dialed is in a meeting". Of course, all the real time ringback tones may not only have voice prompt content, but also may have a voice prompt, music, song, video and/or dialogue. Therefore, when rejecting the call, the called party may explain the reason for being unable to answer the call to the calling party in time and reasonably. Therefore, misunderstanding or estrangement may be prevented from occurring between the calling party and the called party.

In practice, a ringback tone ID may also be sent to play a real time ringback tone when a call is not rejected, for example, to express the current situation such as mood between two friends in real time. Therefore, the individualized requirements of the user may be met more flexibly, and the satisfaction of the user may be improved.

Embodiment 2: The ringback tone indication value is a cause value.

Similar to the above embodiment, a cause value-ringback tone correspondence table is set and saved in a ringback tone unit. In other words, the reason for rejection (such as in a meeting or answering another call) or other current situations are set as different cause values respectively, and then different ringback tone IDs are selected according to the cause values, as shown in Table 4:

TABLE 4

| Cause Of Rejection | Cause Value | Ringback Tone ID |
| --- | --- | --- |
| Null | NULL | default ringback tone 0 |
| In a meeting | 1 | real time ringback tone 1 |
| Answering a call | 2 | real time ringback tone 2 |
| Driving | 3 | real time ringback tone 3 |
| Working | 4 | real time ringback tone 4 |
| Resting | 5 | real time ringback tone 5 |

If the called terminal does not send a cause value, in other words, if the cause value is null, the corresponding ringback tone will be a default ringback tone or a traditional ringback tone. In this case, the ringback tone unit may send the default ringback tone or the traditional ringback tone to the calling terminal. Additionally, if the called terminal, within a time period, has not sent a cause value, in other words, if the cause value is null, the corresponding ringback tone will be a default ringback tone or a traditional ringback tone and the ringback tone unit may send the default ringback tone or the traditional ringback tone to the calling terminal. After the time period, if the called terminal sends a cause value, the corresponding real time ringback tone, such as real time ringback tones 1-5 as shown in Table 1, will be played according to the cause value. These real time ringback tones may have the corresponding voice prompt content about the reason for rejection. For example, real time ringback tone 1 has the corresponding voice prompt content "The subscriber you dialed is in a meeting". Of course, all the real time ringback tones may not only have a voice prompt content, but also may have a voice prompt, music, song, video and/or dialogue, etc. Therefore, the called party may explain the reason for being unable to answer the call to the calling party in time and reasonably. Therefore, misunderstanding or estrangement may be prevented from occurring between the calling party and the called party.

In practice, a cause value may also be sent to play a real time ringback tone when a call is not rejected, for example, to express the current situation such as mood between two friends in real time. Therefore, the individualized requirements of the user may be met more flexibly, and the satisfaction of the user may be improved, as shown in Table 5:

TABLE 5

| Current Situation | Cause Value | Ringback Tone ID |
|---|---|---|
| Null | NULL | default ringback tone 0 |
| Happy | 1 | real time ringback tone 1 |
| Sad | 2 | real time ringback tone 2 |
| Peaceful | 3 | real time ringback tone 3 |
| Tired | 4 | real time ringback tone 4 |
| Light-hearted | 5 | real time ringback tone 5 |

The real time ringback tone in the embodiments of the present invention may be provided by a provider or uploaded by a user, and stored in a ringback tone unit. The ringback tone unit may be an independent RBTS or may be provided in a Mobile Switching Center (MSC). Ringback tone data represented by real time ringback tone IDs is stored in the ringback tone unit. When receiving a ringback tone indication value from the called terminal, the ringback tone unit will find the corresponding real time ringback tone according to the ringback tone indication value and send the corresponding real time ringback tone to the calling terminal.

Practically, the called party may also deliver different ringback tone indication values to the network automatically or manually according to different time periods. For example, after 10 p.m., the called terminal may automatically feed back a ringback tone indication value; during normal working hours, the called terminal may automatically feed back another ringback tone indication value; on Sunday, the called terminal may automatically feed back yet another different ringback tone indication value. If a user is answering a call, the user may also manually feed back a ringback tone indication value and the corresponding ringback tone of the ringback tone indication value may be a voice prompt indicating that the user is answering a call. Therefore, it can be seen that the ringback tone indication value may vary according to time, place, people, event and mood, etc.

The embodiments of the invention further provide a technical solution for a called terminal to send a ringback tone indication value to the T_MSC. Here, appropriate reformation needs to be done to the called terminal, the Originating Mobile Switching Center (O_MSC) and/or the T_MSC. For example, a number receiving function during dial period needs to be enabled in T_MSC (in the existing MSC, number receiving function is barred during dial period), and an application for obtaining and sending a ringback tone ID needs to be stored and set on the called terminal. Two methods for sending a ringback tone indication value to the network will now be described. However, the method for sending a ringback tone indication value to the network is not limited to these two methods.

Solution 1: A ringback tone indication value is sent in Dual Tone Multiple Frequency (DTMF) mode:

A) For a fixed terminal, the operations may be as follows:

1) The called terminal delivers the ringback tone indication value to the T_MSC in DTMF mode directly. In the case the ringback tone indication value is sent manually, if the ringback tone indication value is 1, it may be sent by pressing key "1" on the fixed telephone set. However, in order to avoid misoperation, a confirmation key may be added, such as key "#". In other words, key "#" needs to be pressed before the ringback tone indication value is sent, i.e., key "1" on the called terminal is first pressed, and then key "#" is pressed.

2) After receiving a certain length of characters (such as 2 digits) by resolving a DTMF signal, the T_MSC delivers the ringback tone indication value obtained to the ringback tone unit.

B) For a mobile terminal, the operations may be as follows:

1) The called terminal sends one character of the ringback tone indication value to the T_MSC via a message Start DTMF. In the case the ringback tone indication value is sent manually, if the one character of the ringback tone indication value is 2, the one character of the ringback tone indication value may be sent by pressing key "2" on the mobile terminal. Similarly, in order to avoid misoperation, a confirmation key needs to be added, such key "#". In other words, keys "2" and "#" need to be pressed to send the character 2 of the ringback tone indication value.

2) After receiving a DTMF Ack returned by the T_MSC, the called terminal sends a message Stop DTMF to the T_MSC;

3) The called terminal sends one further character of the ringback tone indication value to the T_MSC via Start DTMF, and after a further message DTMF Ack returned by the T_MSC is received, the called terminal sends a further message Stop DTMF to the T_MSC. The above process is repeated until all the characters of the ringback tone indication value are sent to the T_MSC. Of course, the mobile terminal may also send the ringback tone indication value via Start DTMF by sending a certain length of characters for one time.

Solution 2: The ringback tone indication value is sent via a User to User Signal (UUS) signaling or a message Disconnect:

The content of a message Disconnect is as follows: 3GPP TS 24.008: DISCONNECT message content (mobile station to network direction):

| IEI | Information Element | Type/Reference | Presence | Format | Length |
|---|---|---|---|---|---|
| | Call control Protocol discriminator | Protocol discriminator 10.2 | M | V | ½ |
| | Transaction identifier | Transaction identifier 10.3.2 | M | V | ½ |
| | Disconnect message type | Message type 10.4 | M | V | 1 |
| | Cause | Cause 10.5.4.11 | M | LV | 3-31 |
| 1C | Facility | Facility 10.5.4.15 | O | TLV | 2-? |
| 7E | User-user | User-user 10.5.4.25 | O | TLV | 3-131 |
| 7F | SS version | SS version indicator 10.5.4.24 | O | TLV | 2-3 |

The called terminal may deliver a command code representing the ringback tone indication value to the T_MSC via some information elements of the message Disconnect, such as information element User-user or information element Facility, and the T_MSC may obtain the corresponding ringback tone indication value by resolving the above information element.

Of course, the called terminal may also deliver the corresponding ringback tone indication value information to the T_MSC via some information elements in a response message. For example, the called terminal may send a ringback tone indication value to the T_MSC via a message Connect.

The content of the message Connect is as follows: 3GPP TS 24.008: CONNECT message content (mobile station to network direction)

| IEI | Information element | Type/Reference | Presence | Format | Length |
|---|---|---|---|---|---|
| | Call control protocol discriminator | Protocol discriminator 10.2 | M | V | ½ |
| | Transaction identifier | Transaction identifier 10.3.2 | M | V | ½ |
| | Connect message type | Message type 10.4 | M | V | 1 |
| 1C | Facility | Facility 10.5.4.15 | O | TLV | 2-? |
| 4D | Connected subaddress | Connected subaddress 10.5.4.14 | O | TLV | 2-23 |
| 7E | User-user | User-user 10.5.4.25 | O | TLV | 3-131 |
| 7F | SS version | SS version indicator 10.5.4.24 | O | TLV | 2-3 |
| 2D | Stream Identifier | Stream Identifier 10.5.4.28 | O | TLV | 3 |

The called terminal may deliver a command code representing the ringback tone indication value to the T_MSC via some information elements of the message Connect, such as information element User-user or information element Facility, and the T_MSC may obtain the corresponding ringback tone indication value by resolving the above information element.

In practice, the called terminal may obtain the ringback tone indication value by prompting the user to input. Optionally, a ringback tone indication value corresponding to a predetermined state may be preset on the called terminal, and the called terminal determines the corresponding ringback tone indication value according to the current terminal state. Optionally, the ringback tone indication value may be obtained in a process triggered by an incoming call event. For example, a user is prompted to input a ringback tone indication value when an incoming call is received, the following processing may be performed. When the called terminal receives an incoming call, a dialog box pops up, prompting the called party to input a ringback tone indication value or a ringback tone list is displayed for the called party to select, and after the called party selects the corresponding ringback tone, the corresponding ringback tone indication value will be obtained. Optionally, when an incoming call reaches the called party, the called party opens a dialog box via a menu that is preset, and inputs a ringback tone indication value via the dialog box, or the called party is prompted to select a ringback tone from a ringback tone list. In an example with reference to the terminal state, according to the terminal state or the mode that is preset by the called party, the called terminal may return a ringback tone indication value corresponding to the terminal state or the mode to the network. For example, if the called party is in a meeting, the terminal may be set in meeting mode and the corresponding ringback tone indication value in this mode may be preset. In such a case, when receiving an incoming call, the called terminal will send the ringback tone indication value corresponding to the meeting mode to the network automatically, and the called party does not need to manually input the ringback tone indication value. For another example, before 8 a.m. and after 10 p.m., the called terminal is set in a state corresponding to ringback tone indication value 18. Thus, before 8 a.m. and after 10 p.m., when receiving an incoming call, the terminal will obtain ringback tone indication value 18 automatically, and the ringback tone corresponding to the ringback tone indication value may be "The called terminal automatically prompts you that: the called party is having a rest, please contact tomorrow if there is nothing very important. Thank you!"

The system and method of the invention will be described in detail as follows in conjunction with the specific embodiments.

Figure 1A:
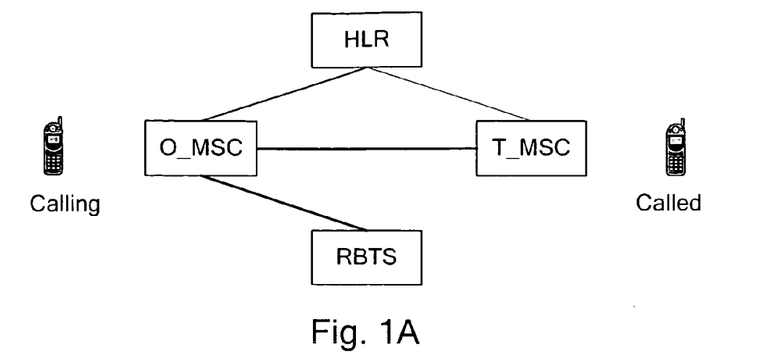
FIG. 1A is a structural diagram of the system according to Embodiment 1 of the present invention.

FIG. 1A is a structural diagram of the system according to Embodiment 1 of the present invention, wherein the system not only includes an O_MSC, a T_MSC and a Home Location Register (HLR) the called terminal homing to, but also includes an RBTS for saving and playing a ringback tone. In this embodiment, a GSM network is employed, but the basic concept may be easily applied to a CDMA system or a fixed communication network system, and the difference lies in that the specific message is different.

Here, the MSC mainly performs service switching function and call control function. Wherein, the O_MSC is an MSC or a Gateway Mobile Switching Center (GMSC) of the calling party. The T_MSC is an MSC visited by the called party and the T_MSC is mainly adapted to save the current information of the called party and establish a connection with the called party during a calling process. The HLR is mainly used to save the basic information of the mobile terminal, including the subscription information of the real time ringback tone service, and so on.

Figure 1B:
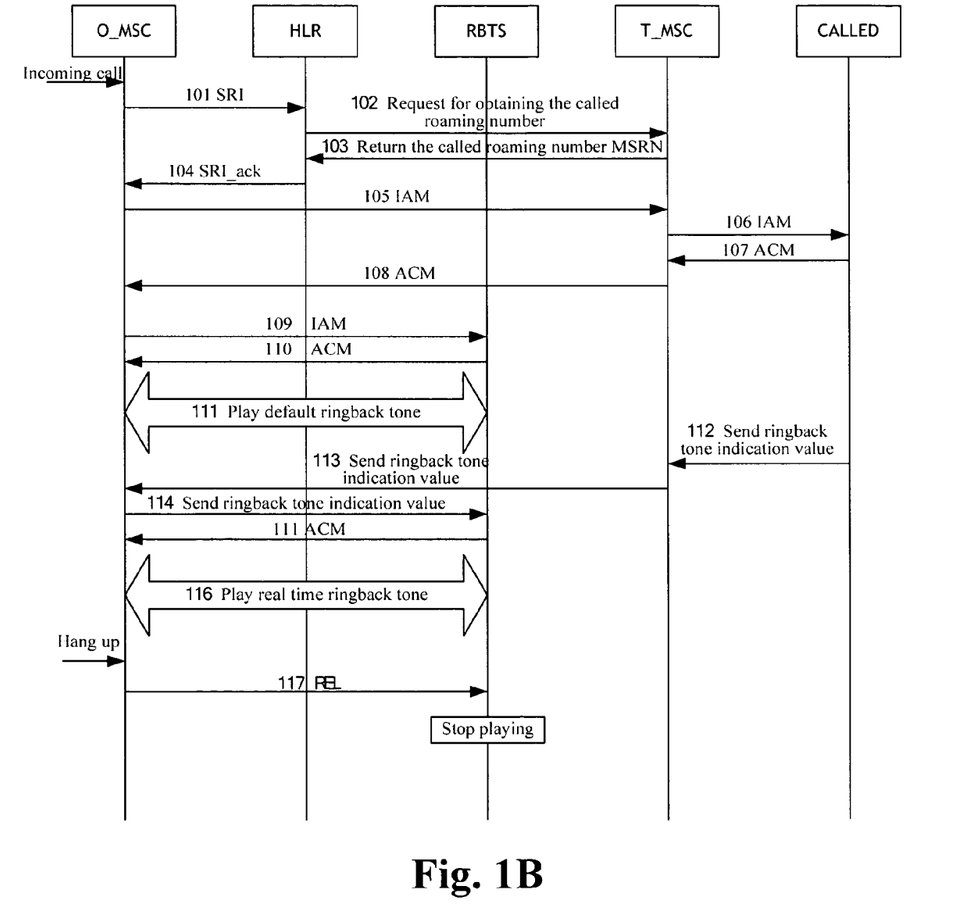
FIG. 1B is a signaling flow chart according to Embodiment 1 of the present invention.

FIG. 1B is a signaling flow chart according to Embodiment 1 of the present invention and the flow chart includes the following steps.

Step 101: On receiving a calling request from a calling terminal, the O_MSC sends a request Send Routing Information (SRI) to the HLR the called party homing to for obtaining the routing information of the called party, wherein the request includes the information such as the called number, and the called number mentioned here is the MSISDN of the called party.

Steps 102-103: The HLR learns that the called party is a subscriber of real time ringback tone service according to the called number. The HLR sends a request for obtaining the called roaming number to the T_MSC. The T_MSC assigns a Mobile Subscriber Roaming Number (MSRN) to the called party and sends the MSRN to the HLR.

Step 104: The HLR sends the MSRN and the real time ringback tone service subscription information of the called party to the O_MSC via a message SRI_Ack.

Step 105: The O_MSC sends an Initial Address Message (IAM) to the T_MSC and the IAM includes the calling number, the called number and the called MSRN.

Steps 106-108: The T_MSC sends the IAM to the called terminal (Called). The T_MSC pages the called terminal, and sends the state information of the called terminal to the O_MSC via an Address Complete Message (ACM) when the called terminal is in idle state. If the current state of the called terminal is not idle, for example, the current state of the called terminal is busy, turned off or out of service area, the T_MSC transparently transmits a voice prompt, which indicates that the called party is busy, turned off or out of service area, to the calling terminal via the O_MSC.

Step 109: The O_MSC sends an IAM to the RBTS, and sends the information such as the calling number and the called number to the RBTS via the IAM. In this embodiment, the play of the ringback tone is controlled by the O_MSC.

Step 110: The RBTS obtains the default ringback tone and then sends an ACM to the O_MSC. Here, when the called terminal does not send the ringback tone indication value, the O_MSC first instructs the RBTS to send the default ringback tone, i.e., the corresponding ringback tone when the ringback tone indication value is null. When the default ringback tone is set according to the called number, the RBTS may search for the default ringback tone customized by the called party according to the called number.

Step 111: The RBTS plays the default ringback tone to the calling terminal via the O_MSC and the O_MSC screens the traditional ringback tone played by the T_MSC.

Step 112: The called terminal obtains a ringback tone indication value and sends the ringback tone indication value to the T_MSC. Here, the T_MSC usually disconnects the connection with the called terminal automatically. In other words, the called terminal will not be alerted by a ringing tone any longer. Of course, the connection with the called terminal may not be disconnected automatically. Instead, the called party may disconnect the connection between the called terminal and the T_MSC by pressing the call-termination key, or the called party may establish the speech path connection between the calling party and the called party by pressing the Answer key. In other words, the existing process will be followed. The called terminal may obtain the ringback tone indication value by prompting the called party to input, or the called terminal may automatically obtains the ringback tone indication value according to the corresponding ringback tone indication value that is set for the current state or the mode of the terminal.

Steps 113-114: The T_MSC sends the ringback tone indication value to the O_MSC and the O_MSC sends the ringback tone indication value to the RBTS.

Step 115: The RBTS searches for the corresponding real time ringback tone according to the ringback tone indication value, and then sends an ACM to the O_MSC.

Step 116: The RBTS plays the real time ringback tone to the calling terminal via the O_MSC, and the RBTS stops playing the default ringback tone. The real time ringback tone includes an audio explanation of the reason why the called party rejects the call. Therefore, misunderstanding, estrangement or unhappiness between the called party and the calling party may be avoided greatly due to the timely explanation.

Step 117: When the calling party hangs up the call, the O_MSC sends a Release (REL) signaling to the RBTS and disconnects the routing with the RBTS immediately. Thus, the RBTS stops playing the real time ringback tone to the calling terminal. Of course, the O_MSC may also preset a play time value of the real time ringback tone, such as 1 minute. When the preset time is up, the O_MSC automatically disconnect the routing with the RBTS.

Figure 2A:
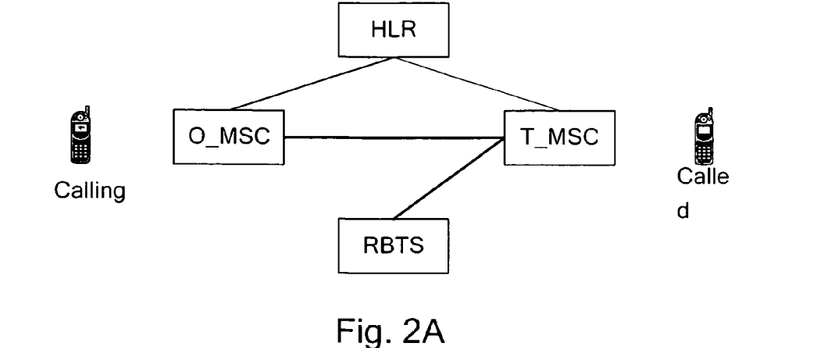
FIG. 2A is a structural diagram of the system according to Embodiment 2 of the present invention.

FIG. 2A is a structural diagram of the system according to Embodiment 2 of the present invention. The difference from FIG. 1A lies in that the RBTS of Embodiment 2 is connected with the T_MSC, but in Embodiment 1, the RBTS is connected with the O_MSC. In other words, in Embodiment 2, the T_MSC controls the play of the real time ringback tone.

Figure 2B:
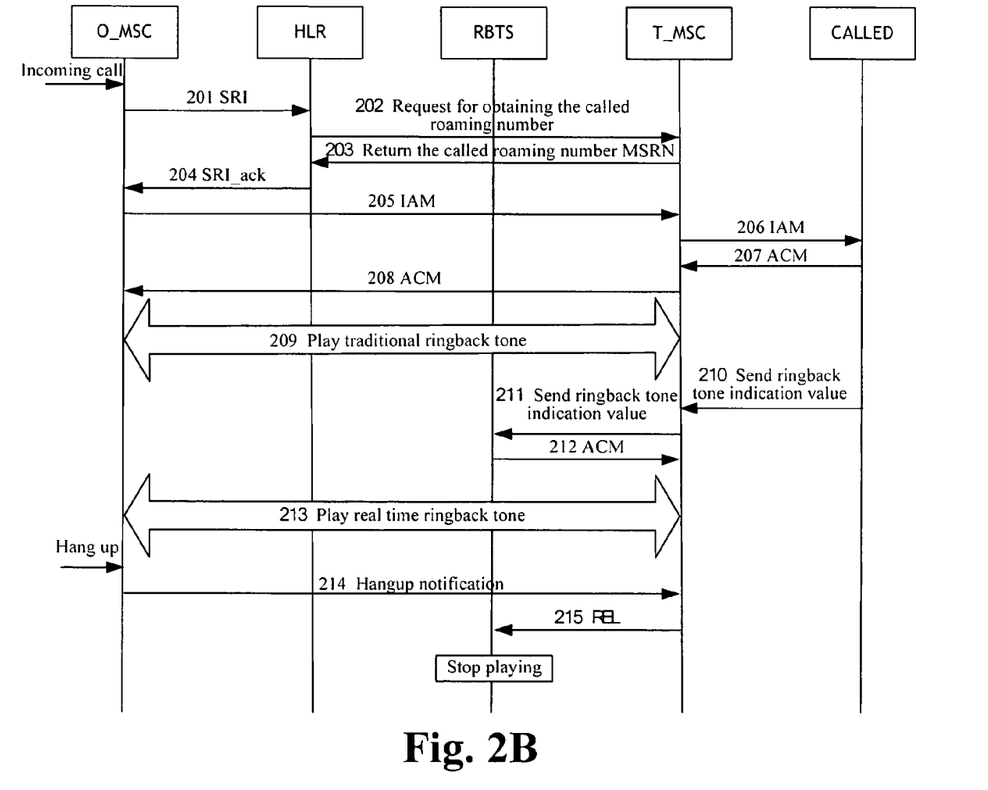
FIG. 2B is a signaling flow chart according to Embodiment 2 of the present invention.

FIG. 2B is a signaling flow chart according to Embodiment 2 of the present invention and the flow chart includes the following steps:

Steps 201-208 are basically the same as Steps 101-108 of Embodiment 1. The difference lies in that the called party does not customize a default ringback tone. Instead, a traditional ringback tone, i.e., a ringing tone of "beep . . . beep . . . ", is sent by the T_MSC. Of course, the same as Embodiment 1, the called terminal may customize a corresponding default ringback tone.

Step 209: The T_MSC sends the traditional ringback tone to the O_MSC, and the traditional ringback tone is finally transparently transmitted to the calling terminal via the O_MSC.

Steps 210-211: The called terminal obtains a ringback tone indication value and sends the ringback tone indication value to the T_MSC. Then, the T_MSC sends the ringback tone indication value to the RBTS. The called terminal may obtain the ringback tone indication value by prompting the called party to input or the called terminal may automatically obtains the ringback tone indication value according to the corresponding ringback tone indication value that is set for the current state or the mode of the called terminal.

Step 212: The RBTS searches for the corresponding real time ringback tone according to the ringback tone indication value, and then sends an ACM to the T_MSC.

Step 213: The RBTS plays the real time ringback tone to the calling terminal via the T_MSC and the O_MSC, and the play of the traditional ringback tone is stopped. Of course, the solution in which the RBTS plays a ringback tone directly via the O_MSC may also be employed. In this case, the RBTS is usually required to have a call control function. This solution is well known to those skilled in the art, so the detailed description of the solution is omitted here.

Step 214: When the calling party hangs up the call, the O_MSC receives the hangup information and sends the hangup information to the T_MSC. Then, Step 215 is performed. Optionally, Step 215 may also be performed after the real time ringback tone is played for an appropriate time period.

Step 215: The T_MSC sends an REL signaling to the RBTS, and disconnects the routing between the T_MSC and the RBTS immediately. Thus the RBTS stops playing the real time ringback tone to the calling terminal.

Figure 3A:
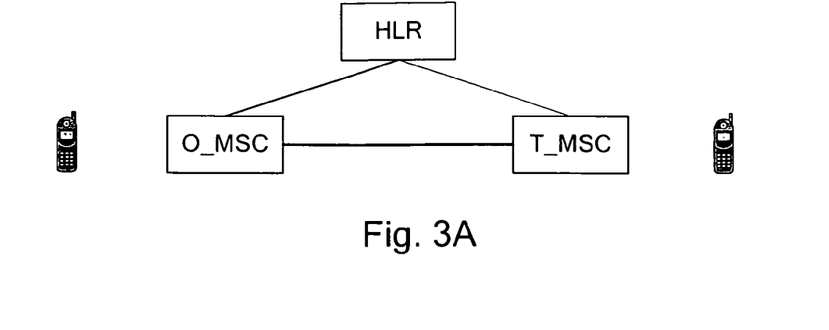
FIG. 3A is a structural diagram of the system according to Embodiment 3 of the present invention.

FIG. 3A is a structural diagram of the system according to Embodiment 3 of the present invention. The system includes an O_MSC, a T_MSC and an HLR, without an RBTS, because this embodiment employs a solution in which the T_MSC saves and plays a real time ringback tone.

Figure 3B:
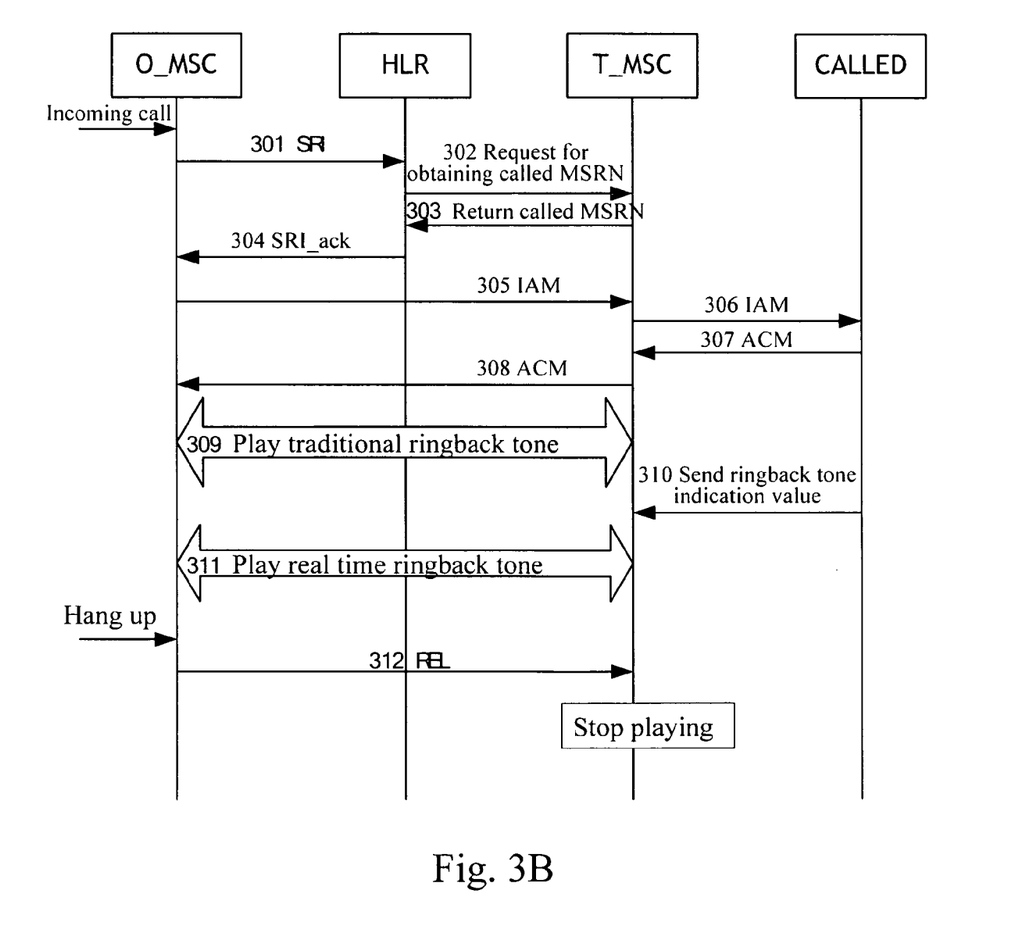
FIG. 3B is a signaling flow chart according to Embodiment 3 of the present invention.

FIG. 3B is a signaling flow chart according to Embodiment 3 of the present invention.

Steps 301-308 are basically the same as Steps 101-108 of Embodiment 1. The difference lies in that the called party does not customize a default ringback tone. Instead, the T_MSC (in which a ringback tone unit is built in) sends a traditional ringback tone, i.e. a ringing tone of "beep . . . beep . . . ". Based on the same concept, the traditional ringback tone may also be sent by the O_MSC.

Step 309: The T_MSC transparently transmits the traditional ringback tone to the calling terminal via the O_MSC.

Step 310: The called terminal obtains a ringback tone indication value and sends the ringback tone indication value to the T_MSC. The called terminal may obtain the ringback tone indication value by prompting the called party to input or the called terminal may automatically obtain the ringback tone indication value according to the corresponding ringback tone indication value that is set for the current state or the mode of the called terminal.

Step 311: The T_MSC searches for the corresponding real time ringback tone according to the ringback tone indication value, and then the T_MSC plays the real time ringback tone to the calling terminal, and the T_MSC stops playing the traditional ringback tone. Here, because the real time ringback tone is stored and played by the T_MSC, the reformation cost of the T_MSC may be high.

Step 312: When the calling party hangs up the call, the O_MSC sends an REL signaling to the T_MSC and disconnects the routing between the O_MSC and the T_MSC immediately. Thus, the T_MSC stops playing the real time ringback tone to the calling terminal. Optionally, the T_MSC may also automatically stop playing the ringback tone after the real time ringback tone is played for an appropriate time period, such as 1 minute. Moreover, after the play of the real time ringback tone is stopped, each embodiment of the invention may select whether to play the traditional prompt tone to the O_MSC, such as "The called party cannot be connected."

Figure 4A:
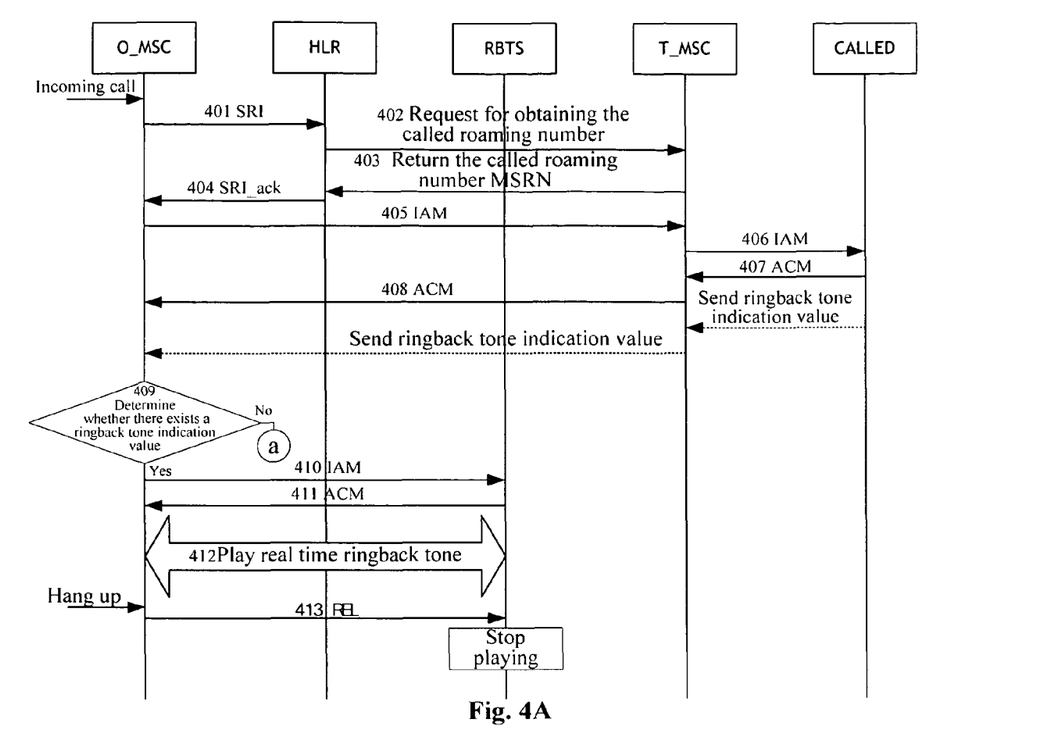
FIG. 4A and FIG. 4B are signaling flow charts according to Embodiment 4 of the present invention.
Figure 4B:
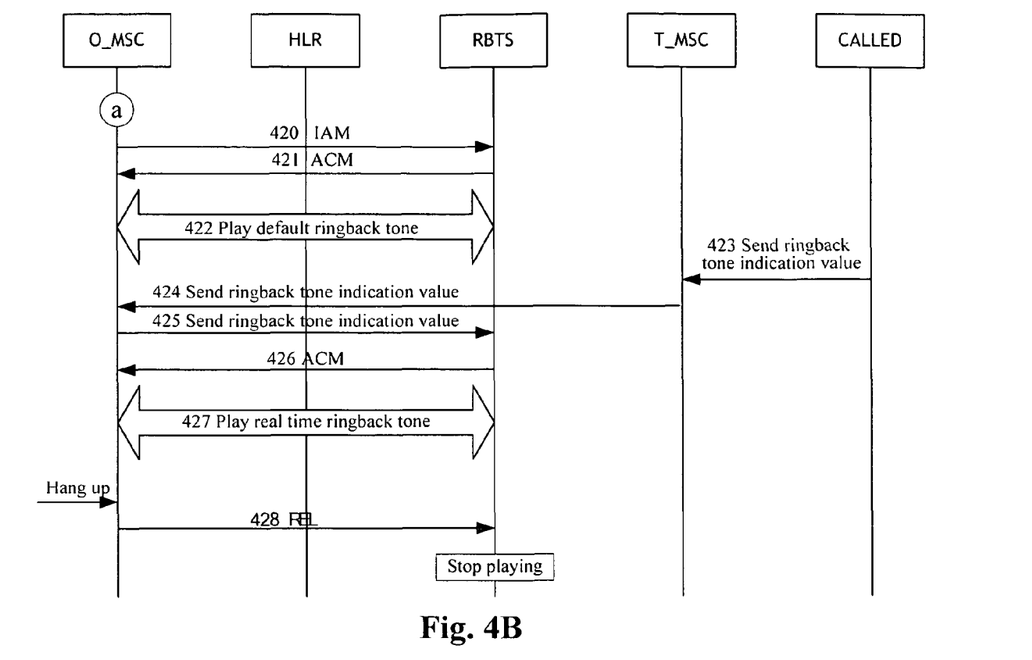

FIG. 4A and FIG. 4B are signaling flow charts according to Embodiment 4 of the present invention, and the structural diagram of the adopted system is as shown in FIG. 1A. In Embodiment 4, before the default ringback tone is played, it needs to determine in a scheduled time period whether the called terminal sends a ringback tone indication value. If a ringback tone indication value is received, a real time ringback tone will be played; otherwise, the default ringback tone will be played.

Steps 401-408 are the same as Steps 101-108 of Embodiment 1.

Step 409: Before the O_MSC instructs the RBTS to play the default ringback tone, a time period, such as 5 seconds, is reserved to determine whether the called terminal sends a ringback tone indication value. Moreover, it needs to screen the traditional ringback tone played by the T_MSC. If a ringback tone indication value is received, Step 410 and its subsequent steps as shown in FIG. 4A will be performed. Otherwise, Step 420 and its subsequent steps as shown in FIG. 4B will be performed. Of course, if the called party does not customize a default ringback tone, the O_MSC may screen the traditional ringback tone for a time period temporarily so as to make determination. The advantage is that the calling party may be prevented from hearing two ringback tones, which may cause the confusion or discomfort of the calling party.

Step 410: The O_MSC sends an IAM to the RBTS, and sends the information such as the calling number, the called number and the ringback tone indication value to the RBTS via the IAM.

Step 411: The RBTS searches for the corresponding real time ringback tone according to the ringback tone indication value, and then sends an ACM to the O_MSC.

Step 412: The RBTS plays the real time ringback tone to the calling terminal via the O_MSC.

Step 413: When the calling party hangs up the call or after the real time ringback tone is played for a certain time, the O_MSC sends an REL signaling to the RBTS and disconnects the routing with the RBTS immediately. Thus, the RBTS stops playing the real time ringback tone to the calling terminal.

In Step 420 shown in FIG. 4B, if the O_MSC does not receive a ringback tone indication value sent by the called terminal in the scheduled time period, the O_MSC sends an IAM to the RBTS, and sends the information such as the calling number and the called number to the RBTS via the IAM.

Step 421: The RBTS obtains the default ringback tone and then sends an ACM to the O_MSC. When the default ringback tone is set according to the called number, the RBTS may search for the default ringback tone customized by the called party according to the called number.

Step 422: The RBTS plays the default ringback tone to the calling terminal via the O_MSC. The above steps may constitute a complete solution of Embodiment 4. When the calling terminal hangs up or when the default ringback tone is played for a scheduled time period, the play of the default ringback tone will be stopped, and the O_MSC disconnects the connection with the calling terminal.

Of course, when the default ringback tone is played here, if the called terminal sends a ringback tone indication value, the O_MSC may select to receive or not to receive the ringback tone indication value. The solution in which the O_MSC selects to receive the ringback tone indication value is as shown in Step 423 and the subsequent steps of FIG. 4B.

Steps 423-425: During the time period in which the RBTS plays the default ringback tone to the calling terminal via the O_MSC, the T_MSC receives the ringback tone indication value sent by the called terminal. The T_MSC forwards the ringback tone indication value to the O_MSC. In turn the O_MSC sends the ringback tone indication value to the RBTS.

Step 426: The RBTS searches for the corresponding real time ringback tone according to the ringback tone indication value, and then sends an ACM to the O_MSC.

Step 427: The RBTS plays the real time ringback tone to the calling terminal via the O_MSC, and the RBTS stops playing the default ringback tone.

Step 428: When the calling party hangs up the call or when the real time ringback tone is played for a certain time, the O_MSC sends an REL signaling to the RBTS and disconnects the routing with the RBTS immediately. Thus, the RBTS stops playing the real time ringback tone to the calling terminal.

The above four embodiments are all used for the called party to explain the reason for rejecting a call. But in practice, the called party may also send different ringback tone indication values in real time according to the actual situation, and the network selects the corresponding real time ringback tone according to the ringback tone indication value and plays the corresponding real time ringback tone to the calling party. The call will be answered after the real time ringback tone is played for an appropriate time period. Such real time ringback tone may be for example the above mentioned real time ringback tone for expressing the current state (mood) between two friends or a ringback tone for signaling the calling party to wait for a moment, so that the requirements of the user may be met flexibly. The specific solution is as shown in Embodiment 5.

Figure 5:
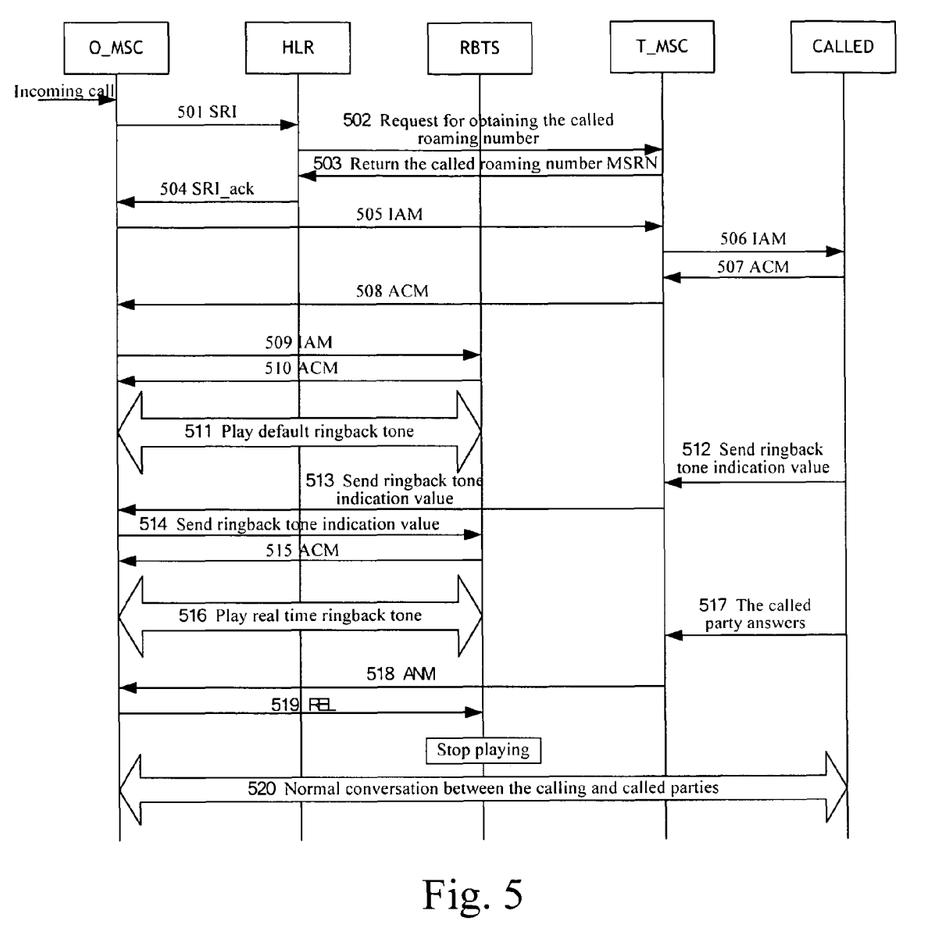
FIG. 5 is a signaling flow chart according to Embodiment 5 of the present invention.

FIG. 5 is a signaling flow chart according to Embodiment 5 of the present invention, wherein Steps 501-516 are basically the same as Steps 101-116 of Embodiment 1. Therefore, the detailed description of these steps is omitted here. The possible difference lies in that in Step 512, after the called terminal sends the ringback tone indication value, the T_MSC shall keep connected with the called terminal.

Steps 517-518: When the called terminal answers, the T_MSC sends an answer message ANM to the O_MSC.

Step 519: The O_MSC sends an REL signaling to the RBTS, and disconnects the routing between the O_MSC and the RBTS immediately. Thus the RBTS stops playing the real time ringback tone to the calling terminal.

Step 520: A normal speech path connection is established between the calling terminal and the called terminal via the O_MSC and the T_MSC.

It should be mentioned that in each embodiment of the invention, if the RBTS plays the default ringback tone or the traditional ringback tone for a scheduled time period and the called terminal does not send the ringback tone indication value, or the called terminal does not answer, or the calling terminal does not hang up, then the O_MSC and/or the T_MSC will instruct the ringback tone unit to stop playing the ringback tone and terminate the call connection. In addition, the invention has no conflict with the subscription of the existing ringback tone service, and one skilled in the art may easily implement the real time ringback tone service based on the original ringback tone subscription service.

Figure 6:
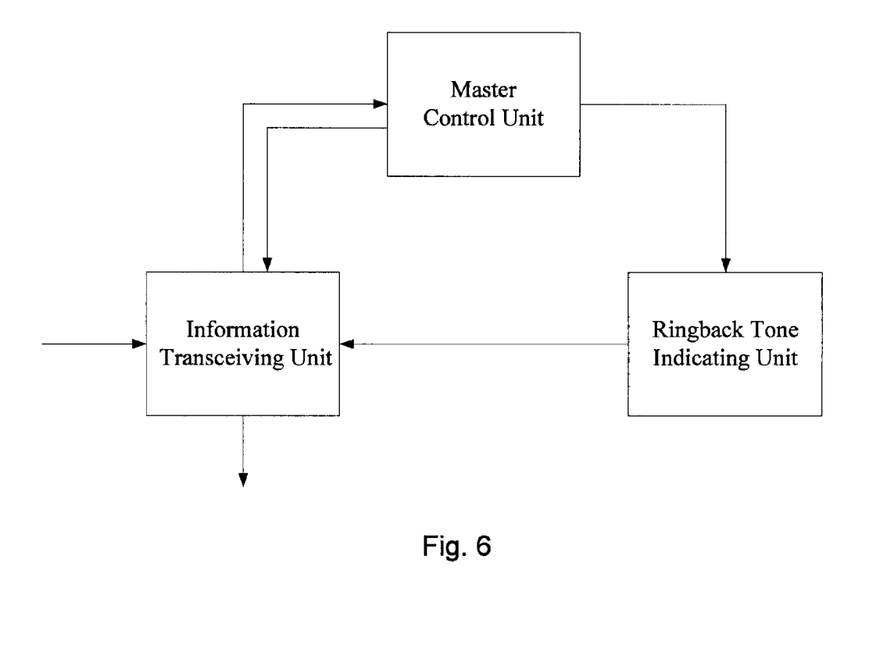
FIG. 6 depicts a structural diagram of a terminal device according to one embodiment.

Additionally, as shown in FIG. 6, an embodiment of the invention further provides a terminal including an information transceiving unit, a ringback tone indicating unit, and a master control unit. When the terminal is used as a called terminal:

the information transceiving unit is adapted to deliver received information to the master control unit and sends information to the outside under the control of the master control unit;

the master control unit, when determining that a calling request from the calling terminal is received, is adapted to perform a call connection operation and notify the ringback tone indicating unit of the receipt of the calling request; and the ringback tone indicating unit is adapted to send a ringback tone indication value via the information transceiving unit according to the notification received, wherein the ringback tone indication value is a ringback tone ID or a cause value.

It should be emphasized that the above-described embodiments, particularly, any preferred embodiments, are merely possible examples of implementations, and merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

The invention claimed is:

1. A method for providing ringback tone in a communication network, comprising:

subscribing, by the called terminal, to a real time ringback tone service; and saving subscription information in a Home Location Register (HLR) corresponding to the called terminal;

sending, by the calling terminal, a calling request to the called terminal via an Originating Mobile Switching Center (O_MSC);

obtaining, by the O_MSC, the subscription information and routing information of the called terminal from the HLR;

sending, by the O_MSC, the calling request to the called terminal via a Terminating Mobile Switching Center (T_MSC);

establishing a call connection between a calling terminal and a called terminal according to a calling request sent by the calling terminal;

instructing, by at least one of the O_MSC and the T_MSC, a ringback tone unit to play a default ringback tone or a traditional ringback tone before the T_MSC receives the ringback tone indication value;

receiving a ringback tone indication value from the called terminal;

sending, by the T_MSC, the ringback tone indication value to the ringback tone unit;

obtaining, by the ringback tone unit, a corresponding ringback tone according to the ringback tone indication value;

stopping, by the ringback tone unit, playing the default ringback tone or the traditional ringback tone; and playing, by the ringback tone unit, the corresponding ringback tone on the calling terminal.

2. The method for providing ringback tone according to claim 1, further comprising:

playing a default ringback tone or a traditional ringback tone when the corresponding ringback tone obtained according to the ringback tone indication value is null.

3. The method for providing ringback tone according to claim 1, further comprising:

sending, by the called terminal, the ringback tone indication value to the T_MSC in a Dual Tone Multiple Frequency (DTMF) mode.

4. The method for providing ringback tone according to claim 3, further comprising:

sending, by the T_MSC, the ringback tone indication value directly or indirectly.

5. The method for providing ringback tone according to claim 3, further comprising:

inputting the ringback tone indication value by the called terminal and sending the ringback tone indication value to the T_MSC; or presetting the ringback tone indication value corresponding to a predetermined terminal state on the called terminal, and determining, by the called terminal, determines the ringback tone indication value according to a current terminal state and sending the ringback tone indication value to the T_MSC automatically.

6. The method for providing ringback tone according to claim 3, wherein, the T_MSC disconnects or does not disconnect the called party terminal as the ringback tone indication value is sent to the T_MSC.

7. The method for providing ringback tone according to claim 1, further comprising:

sending, by the called terminal, the ringback tone indication value to the T_MSC by using a message Start DTMF for one or more times.

8. The method for providing ringback tone according to claim 1, further comprising:

sending, by the called terminal, the ringback tone indication value to the T_MSC via one of a User-to-User Signaling (UUS), a Disconnect message, or a Connect message.

9. The method for providing ringback tone according to claim 1, further comprising:
   in a scheduled time period after the T_MSC learns that the called terminal is in an idle state, determining, by at least one of the T_MSC and O_MSC, whether the called terminal sends the ringback tone indication value without playing any ringback tone on the calling terminal;
   if the T_MSC receives the ringback tone indication value in the scheduled time period, obtaining the corresponding ringback tone according to the ringback tone indication value and playing the corresponding ringback tone on the calling terminal; otherwise, playing, by a ringback tone unit, a default ringback tone or a traditional ringback tone on the calling terminal; and
   the obtaining of the corresponding ringback tone according to the ringback tone indication value, and the playing of the corresponding ringback tone on the calling terminal comprising:
   the sending, by the T_MSC, the ringback tone indication value to the ringback tone unit directly or indirectly;
   obtaining, by the ringback tone unit, the corresponding ringback tone according to the ringback tone indication value; and
   playing, by the ringback tone unit, the corresponding ringback tone on the calling terminal.

10. The method for providing ringback tone according to claim 1, further comprising:
    instructing, by at least one of the O_MSC and the T_MSC, the ringback tone unit to stop playing the default ringback tone or the traditional ringback tone;
    terminating the call connection as the ringback tone unit plays the default ringback tone or the traditional ringback tone for a scheduled time period and the called party terminal does not send any ringback tone indication value, does not answer, or does not hang up.

11. The method for providing ringback tone according to claim 1, wherein,
    instructing, by at least one of the O_MSC and the T_MSC, a ringback tone unit to stop playing the corresponding ringback tone and terminating the call connection as the calling terminal hangs up; or
    instructing, by at least one of the O_MSC and the T_MSC, a ringback tone unit to stop playing the corresponding ringback tone and connecting a speech path between the calling terminal and the called terminal as the called terminal answers; or
    instructing, by at least one of the O_MSC and the T_MSC, a ringback tone unit to stop playing the corresponding ringback tone and terminating the call connection after the ringback tone unit plays the corresponding ringback tone for a scheduled time period.

12. The method for providing ringback tone according to claim 1, wherein the ringback tone indication value is a ringback tone ID or a cause value.

13. The method for providing ringback tone according to claim 12, further comprising:
    when the ringback tone indication value is a cause value, saving a cause value-ringback tone correspondence table in a ringback tone unit, each cause value in the correspondence table corresponding to a different ringback tone ID; and
    setting the cause values and the ringback tone IDs in the cause value-ringback tone correspondence table for all calling terminals, and determining the ringback tone ID according to the cause value; or
    setting the cause values and the ringback tone IDs in the cause value-ringback tone correspondence table for individual calling terminals, adding a column of calling terminal IDs to the correspondence table, and determining the ringback tone ID according to the calling terminal ID and the cause value; or
    setting the cause values and the ringback tone IDs in the cause value-ringback tone correspondence table for all the called terminals and, for any called terminal, the determining the ringback tone ID according to the cause value; or
    setting the cause values and the ringback tone IDs in the cause value-ringback tone correspondence table for individual called terminals, adding a column of called terminal IDs to the correspondence table, and determining the ringback tone ID according to the called terminal ID and the cause value.

14. The method for providing ringback tone according to claim 12, wherein, the cause value represents a rejection reason of the called terminal or a current state of the called terminal.

15. A system for providing ringback tone in a communication network, comprising:
    a ringback tone unit configured to:
    store ringback tones;
    play a default ringback tone or a traditional ringback tone in accordance with instructions from at least one of a Terminating Mobile Switching Center (T_MSC) and an Originating Mobile Switching Center (O_MSC) before the T_MSC receives a ringback tone indication value;
    receive the ringback tone indication value sent from a called terminal;
    obtain a corresponding ringback tone according to the ringback tone indication value;
    stop playing the default ringback tone or the traditional ringback tone; and
    play the corresponding ringback tone on a calling terminal,
    wherein:
      the called terminal subscribes to a real time ringback tone service, subscription information being stored in a Home Location Register (HLR) corresponding to the called terminal,
      the calling terminal sends a calling request to the called terminal via the O_MSC;
      the O_MSC obtains the subscription information and routing information of the called terminal from the HLR and sends the calling request to the called terminal via the T_MSC; and
      the T_MSC sends the ringback tone indication value to the ringback tone unit.

16. The system for providing ringback tone according to claim 15, wherein, the ringback tone unit is configured in the T_MSC or the O_MSC; or the ringback tone unit is an independent Ringback Tone Server (RBTS).

17. The system for providing ringback tone according to claim 15, wherein, the ringback tone indication value is a ringback tone ID or a cause value.

18. A terminal, comprising:
    an information transceiving unit configured to deliver received information to a master control unit and send information outside under control of the master control unit;
    the master control unit configured to perform a call connection operation when determining that a calling request is received from a calling terminal via an Originating Mobile Switching Center (O_MSC), and send a notification to a ringback tone indicating unit; and the ringback tone indicating unit configured to send a ringback tone indication value to a ringback tone unit via the information transceiving unit according to the notification, wherein:

the terminal is further configured to subscribe to a real time ringback tone service, subscription information being stored in a Home Location Register (HLR) corresponding to the terminal, the O_MSC obtains the subscription information and routing information of the terminal from the HLR and sends the calling request to the terminal via a Terminal Mobile Switching Center (T_MSC):

the T_MSC sends the ringback tone indication value to the ringback tone unit;

at least one of the O_MSC and the T_MSC instructs the ringback tone unit to play a default ringback tone or a traditional ringback tone before the T_MSC receives the ringback tone indication value; and the ringback tone unit stops playing the default ringback tone or the traditional ringback tone and plays a ringback tone corresponding to the ringback tone indication value.

19. The terminal according to claim 18, wherein, the ringback tone indication value is a ringback tone ID or a cause value.

* * * * *